US012385516B2

(12) United States Patent
Weyland et al.

(10) Patent No.: US 12,385,516 B2
(45) Date of Patent: Aug. 12, 2025

(54) O-RING COLLAR SEAL

(71) Applicant: GM GLOBAL TECHNOLOGY OPERATIONS LLC, Detroit, MI (US)

(72) Inventors: Benjamin Weyland, Warren, MI (US); Charles E. Jensen, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 18/170,856

(22) Filed: Feb. 17, 2023

(65) Prior Publication Data

US 2024/0280133 A1    Aug. 22, 2024

(51) Int. Cl.
*F16B 43/00* (2006.01)
*F16J 15/06* (2006.01)

(52) U.S. Cl.
CPC ........... *F16B 43/001* (2013.01); *F16J 15/061* (2013.01); *F16J 15/062* (2013.01)

(58) Field of Classification Search
CPC ........ F16J 15/022; F16J 15/061; F16J 15/062; F16J 15/10; F16J 15/102; F16J 15/104; F16J 15/106; F16B 43/001
See application file for complete search history.

(56) References Cited

U.S. PATENT DOCUMENTS

| | | | | |
|---|---|---|---|---|
| 3,334,774 A | * | 8/1967 | Poltorak | F16J 15/106 277/648 |
| 3,367,682 A | * | 2/1968 | Meriano | F16L 23/18 277/614 |
| 4,585,026 A | * | 4/1986 | Norton | F16K 1/2263 277/634 |
| 5,466,016 A | * | 11/1995 | Briody | F16L 41/082 29/523 |
| 6,761,360 B2 | * | 7/2004 | Hammi | B64D 37/005 277/630 |
| 7,621,568 B2 | * | 11/2009 | Schroeder | F16J 15/061 285/205 |
| 8,104,773 B2 | * | 1/2012 | Schroeder | F16L 41/086 285/368 |
| 8,419,021 B2 | * | 4/2013 | Mellander | F16J 15/061 277/567 |
| 8,523,244 B2 | * | 9/2013 | Schroeder | F16J 15/061 285/205 |

(Continued)

*Primary Examiner* — Nicholas L Foster
(74) *Attorney, Agent, or Firm* — Quinn IP Law

(57) ABSTRACT

An O-ring collar seal for an interface between adjacent first and second components includes a cylindrical structure arranged along a longitudinal axis and characterized by an L-shape in a cross-sectional view. The L-shape includes a first section orthogonal to the longitudinal axis, with a distal end extending toward the axis for being sandwiched between the components. The L-shape also includes a second section extending from the first section, arranged parallel to the longitudinal axis, and configured to retain the O-ring collar seal on the first component. The L-shape additionally includes a round shape third section arranged on the first section's distal end for being compressed by the adjacent components to generate sealing pressure therebetween when the O-ring collar seal is installed in the interface. The first and second sections of the L-shape together define a collar portion and the third section defines an O-ring portion of the O-ring collar seal.

17 Claims, 3 Drawing Sheets

(56) References Cited

U.S. PATENT DOCUMENTS

| | | | |
|---|---|---|---|
| 10,337,636 B2* | 7/2019 | Futakuchi | F16K 27/029 |
| 10,591,097 B2* | 3/2020 | Nahrwold | F16L 23/18 |
| 10,641,394 B2* | 5/2020 | Uhlenkamp | F16L 17/06 |
| 11,644,129 B2* | 5/2023 | Uhlenkamp | F16L 17/06 |
| | | | 277/614 |
| 2002/0041099 A1* | 4/2002 | Grun | F16L 23/04 |
| | | | 285/364 |
| 2007/0273102 A1* | 11/2007 | Schroeder | F16J 15/062 |
| | | | 277/312 |
| 2008/0093844 A1* | 4/2008 | Casey, Sr. | F16L 23/10 |
| | | | 285/135.2 |
| 2009/0058015 A1* | 3/2009 | Laule | B60K 15/077 |
| | | | 277/591 |
| 2009/0179388 A1* | 7/2009 | Uhlenkamp | F16L 23/22 |
| | | | 277/612 |
| 2010/0052268 A1* | 3/2010 | Schroeder | F16L 41/086 |
| | | | 277/612 |
| 2010/0109260 A1* | 5/2010 | Mellander | F16J 15/061 |
| | | | 277/619 |
| 2012/0091708 A1* | 4/2012 | Schroeder | F16L 41/086 |
| | | | 285/374 |
| 2018/0187793 A1* | 7/2018 | Futakuchi | F16K 27/041 |
| 2018/0231126 A1* | 8/2018 | Uhlenkamp | F16J 15/104 |
| 2020/0232560 A1* | 7/2020 | Uhlenkamp | F16J 15/104 |
| 2024/0003472 A1* | 1/2024 | Gericke | F16J 15/062 |
| 2024/0167568 A1* | 5/2024 | Whitehead | F16J 15/062 |

\* cited by examiner

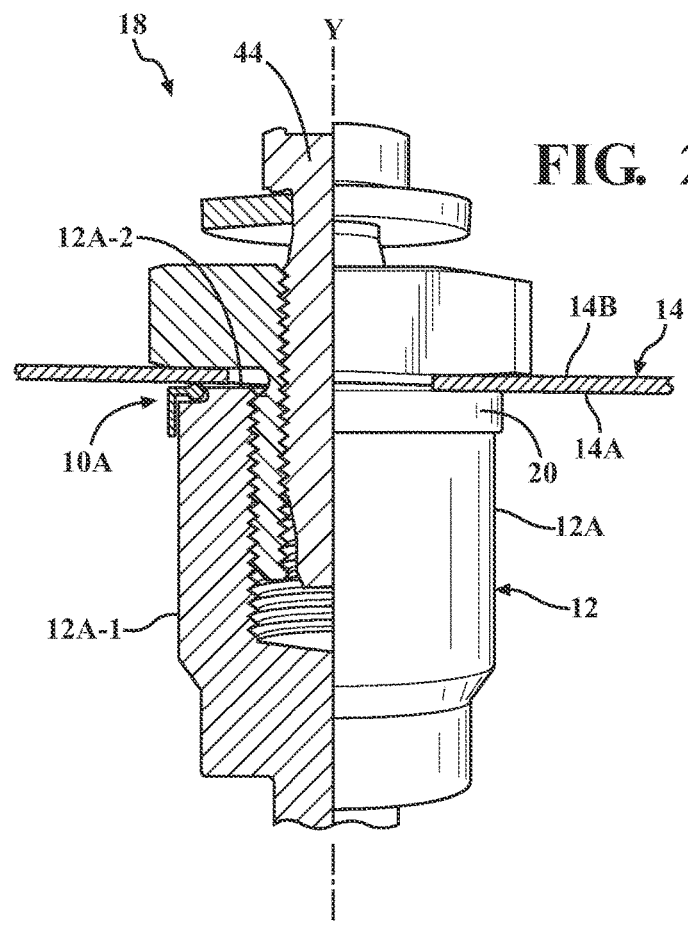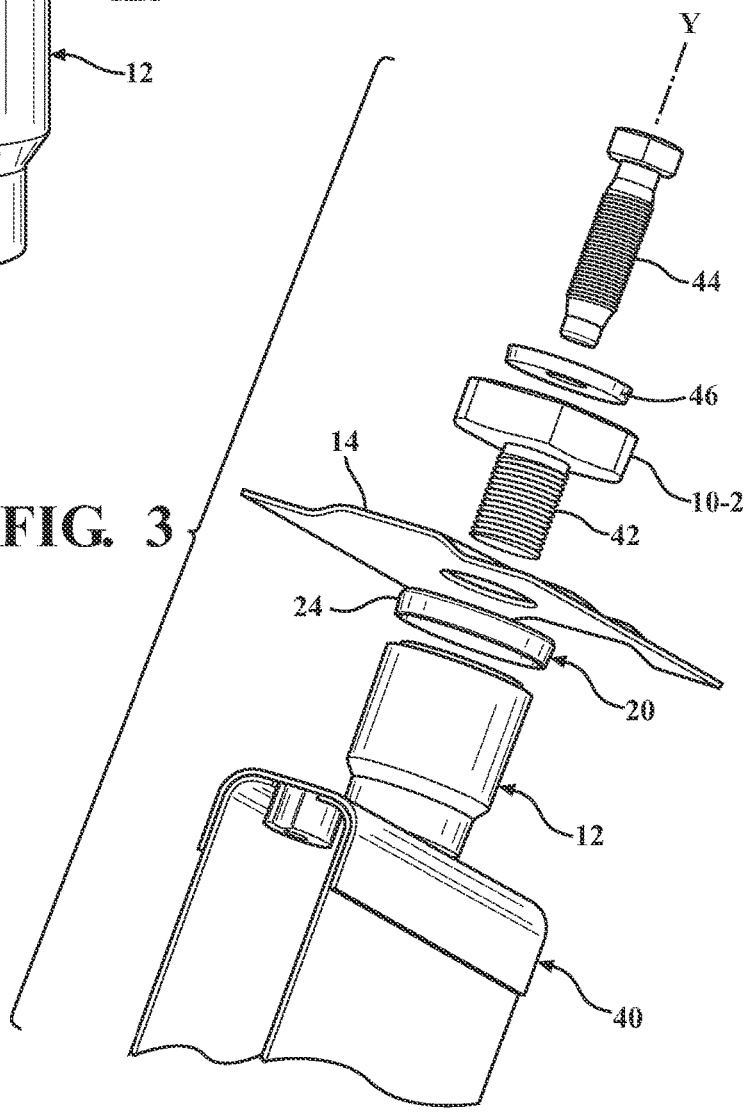

O-RING COLLAR SEAL

INTRODUCTION

The present disclosure relates to an O-ring collar seal for an interface between adjacent components.

A gasket or seal is a mechanical component that fills the space between mating surfaces, generally to prevent leakage of a fluid from or into the joined objects while the seal is under compression. Seals permit "less-than-perfect" mating surfaces on machine parts to be joined without allowing leakage by using the gasket to fill surface irregularities. Seals also keep external contaminants out of the resultant assembly. Seals are commonly produced from sheet or molded materials such as paper, natural rubber, synthetic rubber, metal, or a plastic polymer.

An O-ring is a gasket made from compressible material in a shape of a loop with a round cross-section. An O-ring is typically designed to be seated in a groove and compressed during assembly between two or more objects, forming a seal at the interface. O-rings may be used in static applications where, following assembly of a joint, interfacing objects remain in constant position relative to one another and the O-ring. O-rings may also be used in dynamic applications where there is relative motion between one or more of the interfacing objects and the O-ring.

O-rings may be used to seal pressurized fluid joints. O-ring material may be elastomeric. The O-ring material may be vulcanized solid such that it is impermeable to the sealed fluid. The maximum recommended pressure of an O-ring seal depends on the seal hardness, material, cross-sectional diameter, and radial clearance between the O-ring and supporting structure in the joint. Typically, O-rings are produced by extrusion, injection molding, pressure molding, or transfer molding.

SUMMARY

An O-ring collar seal for an interface between adjacent first and second components includes a cylindrical structure arranged along a longitudinal axis and characterized by an L-shape in a cross-sectional view. The L-shape includes a first section arranged orthogonal to the longitudinal axis and having a first length and a distal end extending toward the longitudinal axis. The first section is sandwiched between the adjacent components when the O-ring collar seal is installed in the interface. The L-shape also includes a second section extending from the first section and arranged parallel to the longitudinal axis. The second section has a second length that may be longer or shorter than the first length.

The second section is configured to engage a first portion of an exterior surface of the first component arranged parallel to the longitudinal axis to thereby retain the O-ring collar seal on the first component. The L-shape additionally includes a third section arranged on the distal end of the first section. The third section has a round shape and is configured to be compressed by the adjacent components to generate sealing pressure therebetween when the O-ring collar seal is installed in the interface. The first section and the second section of the L-shape together define a collar portion of the O-ring collar seal and the third section defines an O-ring portion of the O-ring collar seal.

The first component may additionally include a second portion of the exterior surface arranged perpendicular to the longitudinal axis. The second portion of the exterior surface of the first component may generate and/or define a groove arranged concentrically with respect to the longitudinal axis. In such an embodiment, the O-ring portion of the O-ring collar seal may be configured to seat in the groove.

The groove of the first component may include a flat surface configured to contact the third section or a concave surface configured to seat the third section.

Alternatively, the groove of the first component may include an undercut configured to retain the O-ring portion on the first component.

The O-ring collar seal may have a unitary structure. Each of the first, second, and third sections may be constructed from one, i.e., same, material.

Alternatively, at least one of the first, second, and third sections may be constructed from a material distinct from materials of at least one of the other of the first, second, and third sections. In such an embodiment, the cylindrical structure may be constructed from co-molded materials.

The third section may have a diameter that is greater than a thickness of the first section. In such an embodiment, the round shape may extend or protrudes beyond the thickness of the first section to generate sealing pressure between the adjacent first and second components when the O-ring collar seal is installed in the interface.

The cylindrical structure may be constructed from a compliant material.

A sealed joint assembly including first and second components and the O-ring collar seal for an interface therebetween is also disclosed. The O-ring collar seal may be configured to minimize entry of moisture into and escape of gases across the sealed joint.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 2 is a schematic close-up perspective partially cut-away view of the interface between adjacent components, depicting an O-ring collar seal installed in the interface shown in FIG. 1, according to the disclosure.

FIG. 3 is a schematic close-up exploded perspective view of the interface between adjacent components, including the O-ring collar seal, shown in FIG. 2, according to the disclosure.

DETAILED DESCRIPTION

Figure 1:
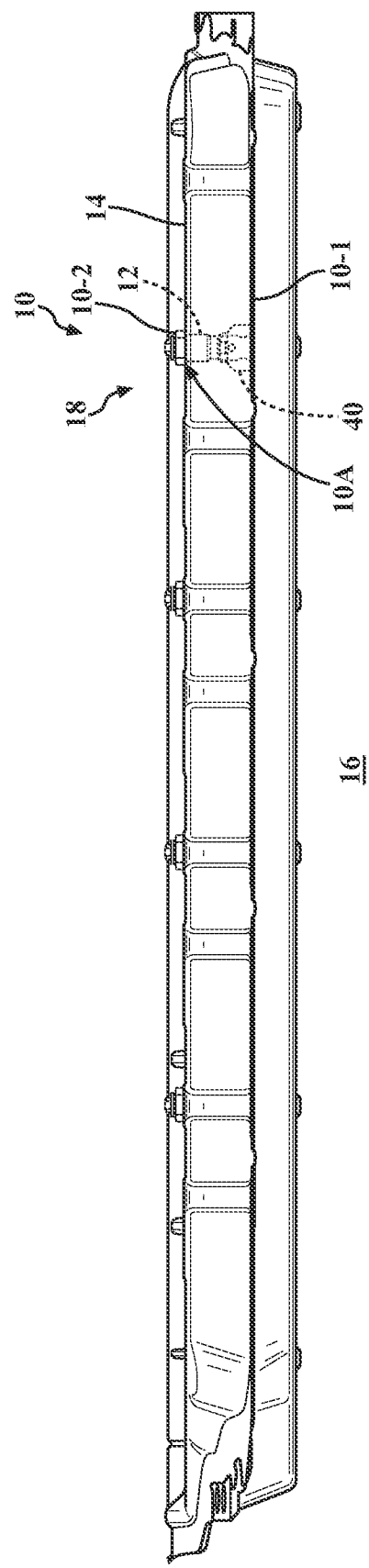
FIG. 1 is a schematic perspective side view of an exemplary interface between adjacent components, according to the present disclosure.

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Referring to the drawings, wherein like reference numbers refer to like components, FIG. 1 shows an assembly 10 of adjacent components-a first component 12, and a second component 14. The assembly 10 includes a joint with an interface 10A between components 12 and 14. The interface 10A may be configured to seal a pressurized fluid.

Generally, the first component 12 and the second component 14 are fastened to each other to generate a robust assembly. Although the assembly 10 may broadly encompass a variety of first and second interfacing components 12, 14, FIG. 1 specifically depicts the assembly 10 as a battery pack enclosure. As shown, the subject battery pack enclosure includes the first component 12, depicted as a threaded stanchion mounted, e.g., welded, to an enclosure tray 10-1, and the second component 14, depicted as a tray cover fastened to the stanchion by a threaded cover nut 10-2. A plurality of such stanchions may be used to reliably fasten the tray cover to the enclosure tray 10-1 at multiple locations, thereby generating the battery pack enclosure.

Generally, the battery pack enclosure depicted in FIG. 1 is intended to house a plurality of battery cells (not shown) and configured to seal the interior of the enclosure from moisture, protect the battery cells from external forces, and inhibit escape of gases generated by the battery cells to a surrounding or ambient environment 16. Accordingly, each location where the tray cover (second component 14) is fastened to the stanchion (first component 12) may be configured to generate a structural joint assembly 18. During its operational life, the joint assembly 18 may experience a considerable temperature and pressure gradient. Accordingly, a reliable sealing method is desired for the interface 10A.

FIG. 2 shows the embodiment of sealed joint assembly 18 illustrated in FIG. 1, including the first component 12 and the second component 14, each arranged relative to a longitudinal axis Y. As shown, the first component 12 has an exterior surface 12A, wherein a first portion 12A-1 of the exterior surface is arranged parallel to the longitudinal axis Y and a second portion 12A-2 of the exterior surface is arranged perpendicular to the longitudinal axis. The second component 14 has an interior surface 14A and an exterior surface 14B, each arranged perpendicular to the longitudinal axis Y. The sealed joint assembly 18 also includes an O-ring collar seal 20 for the interface 10A between the first and second components 12, 14. The O-ring collar seal 20 is generally configured to minimize entry of moisture into and escape of gases across the interface 10A and the sealed joint. As shown, the O-ring collar seal 20 is a continuous band of material.

As shown in FIG. 3, the O-ring collar seal 20 has a generally cylindrical structure 24 arranged along the longitudinal axis Y. The O-ring collar seal cylindrical structure 24 is characterized by an L-shape 26 in a cross-sectional view shown in FIG. 4. The L-shape 26 of the O-ring collar seal 20 includes a first section 28 arranged orthogonal to the longitudinal axis Y. The first section 28 has a constrained end 28-1, a distal end 28-2 extending toward the longitudinal axis Y, and a first length L1 spanning the distance between the two ends. The first section 28 is configured to be sandwiched between the first and second components 12, 14 when the O-ring collar seal 20 is installed in the interface 10A. The L-shape 26 also includes a second section 30 extending from the first section 28.

The second section 30 is arranged parallel to the longitudinal axis Y and is directly connected to the first section 28 at the constrained end 28-1 at approximately a 90-degree angle. The second section 30 has a second length L2, which may be longer or shorter than the first length L1, is configured to engage the first component's first exterior surface portion 12A-1 to thereby retain the O-ring collar seal 20 on the first component 12 via a frictional force. Frictional retention of the O-ring collar seal 20 on the first component 12 facilitates accurate and reliable installation of the O-ring collar seal into the corresponding interface 10A either manually by a technician wearing protective gloves or via automated equipment. The relative lengths L1, L2 of the respective first and second sections 28, 30 may therefore depend on sealing, packaging, assembly, and retention requirements within the joint interface 10A.

Figure 4:
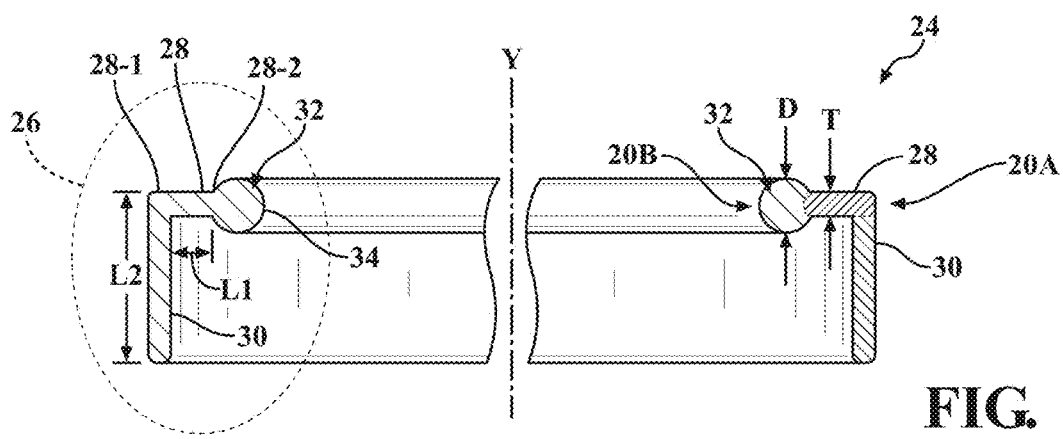
FIG. 4 is a schematic close-up cross-sectional side view of the O-ring collar seal shown in FIG. 1, specifically depicting an L-shape cross-section of the O-ring collar seal, according to the disclosure.

With continued reference to FIG. 4, the L-shape 26 additionally includes a third section 32 arranged on the distal end 28-2 of the first section 28. The third section 32 has a round shape 34 and is configured to be compressed by the first and second components 12, 14 to generate sealing pressure therebetween when the O-ring collar seal 20 is installed in the interface 10A. The third section 32 may have a diameter D that is greater than a thickness T of the first section 28, such that the round shape 34 protrudes beyond the thickness of the first section, as shown in FIG. 4. Such dimensional relationship between the first and third sections 28, 32 is intended to facilitate predictable compression of the third section in the joint assembly 18 and generate repeatable and reliable sealing pressure between the first and second components 12, 14 when the O-ring collar seal 20 is installed in the interface 10A.

As also shown in FIG. 4, the first section 28 and the second section 30 of the L-shape 26 together define a collar portion 20A of the O-ring collar seal 20 and the third section 32 defines an O-ring portion 20B of the O-ring collar seal. The O-ring collar seal 20 may be formed as a unitary, integrated structure and be further identified as "monostructural", denoting the fact that in such an embodiment the cylindrical structure 24 is generated from a uniform, uninterrupted mass of the same material, without the structure having parts or sections composed from a different material (as shown on the left side of the cross-section shown in FIG. 4). Alternatively, the O-ring collar seal 20 may be formed as a unitary structure with at least one of the first, second, and third sections 28, 30, 32 being constructed from a material distinct from materials of at least one of the other of the first, second, and third sections (as shown on the right side of the cross-section shown in FIG. 4). In such an embodiment, the cylindrical structure 24 may be constructed from co-molded materials, such as via over-molding. In each of the above embodiments, the cylindrical structure 24 may be constructed from one or more compliant, polymeric materials, such as Hydrogenated Nitrile Rubber (HNBR) or Ethylene Acrylic Elastomer, e.g., ethylene propylene diene monomer rubber (EPDM), ethylene acrylate copolymer (also called AEM rubber), etc.

Figure 5:
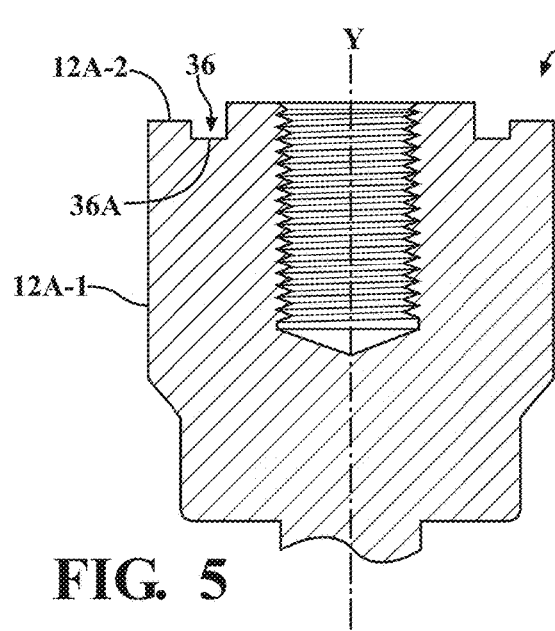
FIG. 5 is a schematic close-up cross-sectional side view of a first of the adjacent components shown in FIG. 1, depicting an embodiment of a groove in the first component for seating an O-ring portion of the O-ring collar seal, according to the disclosure.
Figure 6:
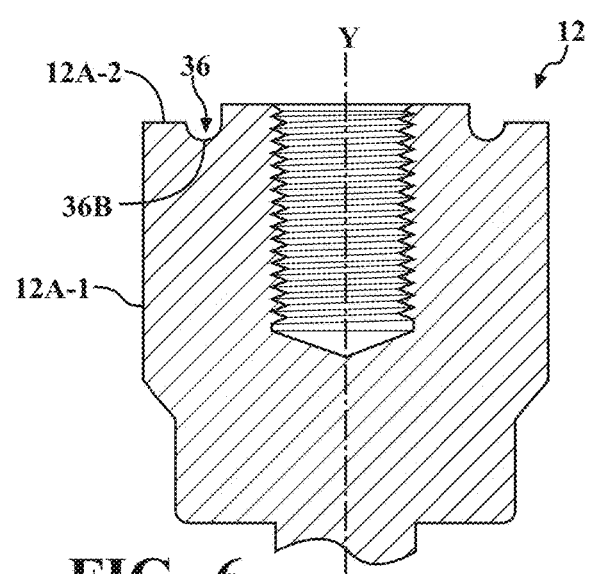
FIG. 6 is a schematic close-up cross-sectional side view of the first of the adjacent components shown in FIG. 1, depicting an alternative embodiment of the groove in the first component for seating the O-ring portion of the O-ring collar seal, according to the disclosure.
Figure 7:
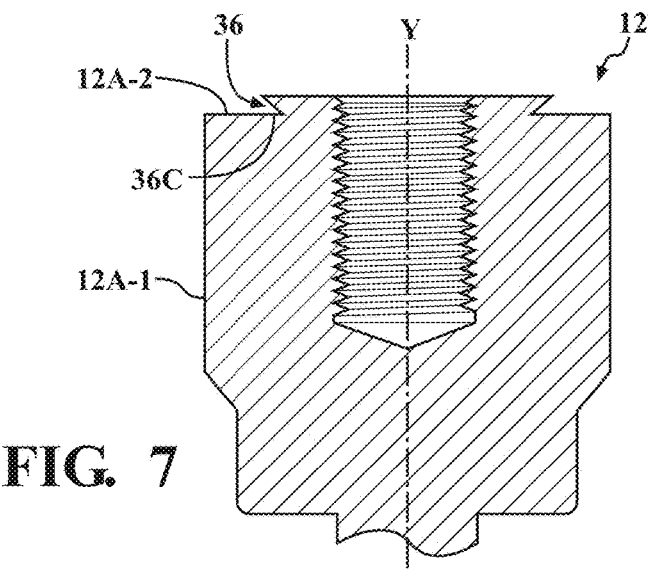
FIG. 7 is a schematic close-up cross-sectional side view of the first of the adjacent components shown in FIG. 1, depicting another alternative embodiment of the groove in the first component for seating the O-ring portion of the O-ring collar seal, according to the disclosure.

As shown in FIGS. 5 and 6, one of the first and second portions 12A-1, 12A-2 of the first component's exterior surface 12A may at least partially define a groove 36 arranged concentrically with respect to the longitudinal axis Y. In such an embodiment, for reliable positioning of the O-ring collar seal 20 in the interface 10A, the O-ring portion 20B of the O-ring collar seal may be configured to seat in the groove 36. As shown in FIG. 5, the groove 36 may include a flat surface 36A substantially defined by the second portion 12A-2 and configured to contact the third section 32. Alternatively, as shown in FIG. 6, the groove 36 may include a concave surface 36B substantially defined by the second portion 12A-2 and configured to substantially match and seat the round shape 34 of the third section 32. In an additional alternative, the groove 36 may have a substantially flat configuration with an undercut 36C substantially defined by the first portion 12A-1 and arranged orthogonal to the longitudinal axis Y, as shown in FIG. 7. The undercut 36C configuration of the groove 36 shown in FIG. 7 may serve to positively retain the O-ring portion 20B of the O-ring collar seal 20 on the first component 12 prior to completion of the assembly 10.

With resumed reference to FIGS. 1-3, the assembly 10 depicted as a battery pack enclosure may additionally include a cross-member 40 attached to an internal surface of the enclosure tray 10-1. In turn, the stanchion 12 may be mounted to the cross-member 40 and thus provide a fixed location on the enclosure tray 10-1 for mounting the tray cover 14. The stanchion 12 may have an internal thread (shown in FIG. 2). The cover nut 10-2 may have a hollow shaft 42 (shown in FIG. 3). The hollow shaft 42 may be threaded both externally and internally. The external thread of the cover nut's hollow shaft 42 may be configured to engage the internal thread of the stanchion 12 to thereby clamp the interface 10A (shown in FIG. 2). The assembled battery pack enclosure 10 may be mounted to an underbody structure of a vehicle (not shown) via a bolt 44 and a washer 46 (shown in FIG. 3) at each joint assembly 18. Specifically, the internal thread of the cover nut's hollow shaft 42 may be engaged by the bolt 44 and tightened against the vehicle structure.

Overall, the O-ring collar seal 20 is intended to provide reliable, leak-free, pressure sealing for an interface in an assembly 10 between adjacent components. The O-ring collar seal 20 is a one-piece, unitary structure which includes two integrated portions serving a dual function of engaging one of the adjacent components for retention thereon with the collar portion 20A and having its O-ring portion 20B sandwiched between the adjacent components to seal the interface. The assembly component being engaged with the collar section may have a groove formed or machined into its surface that contacts the O-ring portion 20B to positively seat the O-ring portion for reliable positioning of the O-ring collar seal 20 in the interface. The unitary cylindrical configuration of the O-ring collar seal 20 additionally provides ease of installation, either manually or via automated equipment, and reliable retention of the O-ring collar seal in a corresponding interface.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A sealed joint assembly comprising:
    a first component configured as a threaded stanchion and a second component configured as a tray cover fastened to the stanchion by a threaded cover nut to thereby clamp an interface between the first and second components, wherein each of the first and second components is arranged relative to a longitudinal axis, and wherein the first component has an exterior surface and a first portion of the exterior surface is arranged parallel to the longitudinal axis;
    an O-ring collar seal installed in the interface between the first and second components, the O-ring collar seal having a cylindrical structure arranged along the longitudinal axis and characterized by an L-shape in a cross-sectional view, wherein the L-shape includes:
        a first section arranged orthogonal to the longitudinal axis and having a first length and a distal end extending toward the longitudinal axis, and configured to be sandwiched between the first and second components when the O-ring collar seal is installed in the interface;
        a second section extending from the first section and arranged parallel to the longitudinal axis, having a second length, and configured to engage the first portion of the exterior surface of the first component to thereby retain the O-ring collar seal on the first component; and
        a third section arranged on the distal end of the first section, having a round shape, and configured to be compressed by the first and second components to generate sealing pressure therebetween when the O-ring collar seal is installed in the interface;
    wherein the first section and the second section of the L-shape together define a collar portion of the O-ring collar seal and the third section defines an O-ring portion of the O-ring collar seal.

2. The sealed joint assembly of claim 1, wherein the first component additionally includes a second portion of the exterior surface arranged perpendicular to the longitudinal axis, wherein one of the first and second portions of the exterior surface of the first component at least partially defines a groove arranged concentrically with respect to the longitudinal axis, and wherein the O-ring portion of the O-ring collar seal is configured to seat in the groove.

3. The sealed joint assembly of claim 2, wherein the groove of the first component includes one of a flat surface configured to contact the O-ring portion and a concave surface configured to seat the O-ring portion, and wherein each surface is defined by the second portion of the exterior surface of the first component.

4. The sealed joint assembly of claim 2, wherein the groove of the first component includes an undercut configured to retain the O-ring portion on the first component, and wherein, in the cross-sectional view, the undercut has a V-shape arranged orthogonal to the longitudinal axis and defined by the first portion of the exterior surface of the first component.

5. The sealed joint assembly of claim 1, wherein the O-ring collar seal has a unitary structure and each of the first, second, and third sections are constructed from one material.

6. The sealed joint assembly of claim 1, wherein the O-ring collar seal has a unitary structure and at least one of the first, second, and third sections is constructed from a material distinct from materials of at least one of the other of the first, second, and third sections.

7. The sealed joint assembly of claim 6, wherein the cylindrical structure is constructed from co-molded materials.

8. The sealed joint assembly of claim 1, wherein the third section has a diameter that is greater than a thickness of the first section, such that the round shape protrudes beyond the thickness of the first section to generate sealing pressure between the first and second components when the O-ring collar seal is installed in the interface.

9. The sealed joint assembly of claim 1, wherein the cylindrical structure is constructed from a compliant polymeric material.

10. The sealed joint assembly of claim 1, wherein:
the first component has an internal thread, the cover nut has a hollow shaft;
the hollow shaft is threaded both externally and internally; and
the external thread of the hollow shaft is configured to engage the internal thread of the first component to thereby clamp the interface.

11. A sealed joint assembly comprising:
a first component configured as a threaded stanchion and a second component configured as a tray cover fastened to the stanchion by a threaded cover nut to thereby clamp an interface between the first and second components, wherein:
  each of the first and second components is arranged relative to a longitudinal axis;
  the first component has an exterior surface and a first portion of the exterior surface is arranged parallel to the longitudinal axis and a second portion of the exterior surface is arranged perpendicular to the longitudinal axis; and
  one of the first and second portions of the exterior surface at least partially defines a groove arranged concentrically with respect to the longitudinal axis;
a unitary O-ring collar seal installed in the interface between the first and second components, the O-ring collar seal having a cylindrical structure arranged along the longitudinal axis and characterized by an L-shape in a cross-sectional view, wherein the L-shape includes:
  a first section arranged orthogonal to the longitudinal axis and having a first length and a distal end extending toward the longitudinal axis, and sandwiched between the first and second components when the O-ring collar seal is installed in the interface;
  a second section extending from the first section and arranged parallel to the longitudinal axis, having a second length, and configured to engage the first portion of the exterior surface of the first component to thereby retain the O-ring collar seal on the first component; and
  a third section arranged on the distal end of the first section, having a round shape, and configured to be compressed by the first and second components to generate sealing pressure therebetween when the O-ring collar seal is installed in the interface;
wherein the first section and the second section of the L-shape together define a collar portion of the O-ring collar seal and the third section defines an O-ring portion of the O-ring collar seal, and wherein the O-ring portion of the O-ring collar seal is configured to seat in the groove of the first component.

12. The sealed joint assembly of claim 11, wherein the groove of the first component includes an undercut configured to retain the O-ring portion on the first component, and wherein, in the cross-sectional view, the undercut has a V-shape arranged orthogonal to the longitudinal axis and defined by the first portion of the exterior surface of the first component.

13. The sealed joint assembly of claim 11, wherein the O-ring collar seal has a unitary structure and each of the first, second, and third sections are constructed from one material.

14. The sealed joint assembly of claim 11, wherein the O-ring collar seal has a unitary structure and at least one of the first, second, and third sections is constructed from a material distinct from materials of at least one of the other of the first, second, and third sections.

15. The sealed joint assembly of claim 14, wherein the cylindrical structure is constructed from co-molded materials.

16. The sealed joint assembly of claim 11, wherein:
the first component has an internal thread, the cover nut has a hollow shaft;
the hollow shaft is threaded both externally and internally; and
the external thread of the hollow shaft is configured to engage the internal thread of the first component to thereby clamp the interface.

17. The sealed joint assembly of claim 11, wherein the groove of the first component includes one of a flat surface configured to contact the O-ring portion and a concave surface configured to seat the O-ring portion, and wherein each surface is defined by the second portion of the exterior surface of the first component.

* * * * *